Feb. 29, 1944.        H. M. EVJEN ET AL        2,342,628
COUPLING CIRCUIT
Filed April 23, 1942
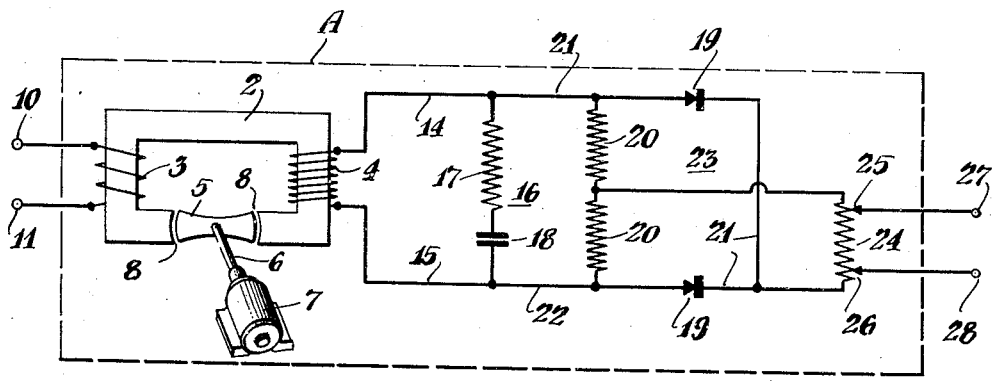
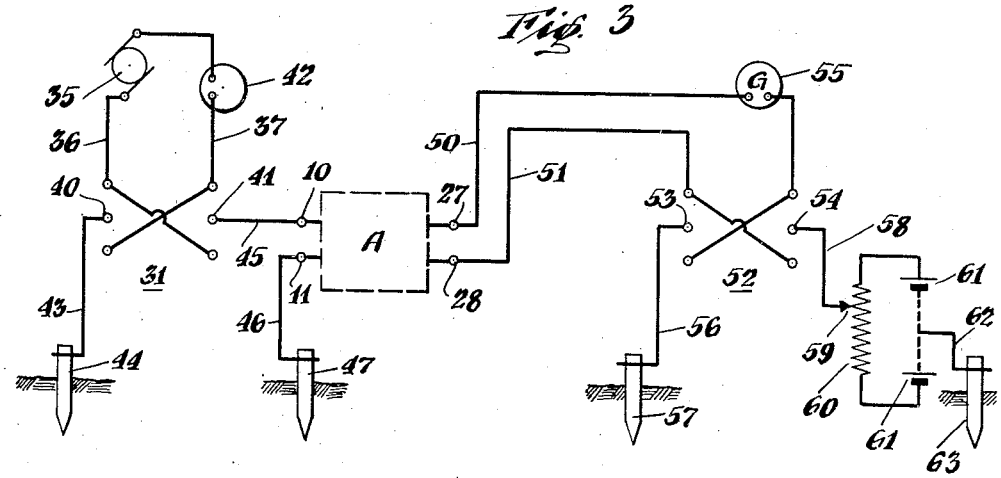
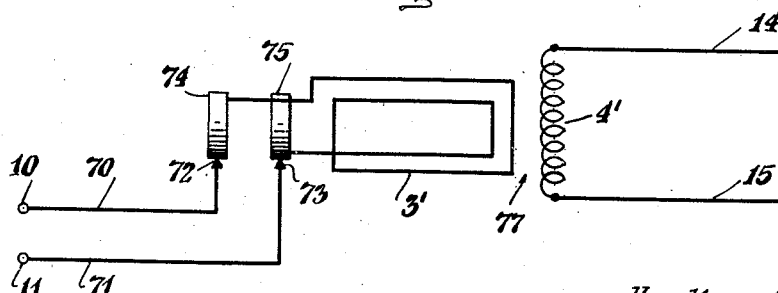
INVENTORS
Haakon M. Evjen
BY William Bradley Lewis
N. T. Leek
ATTORNEY

UNITED STATES PATENT OFFICE 2,342,628

COUPLING CIRCUIT

Haakon M. Evjen and William Bradley Lewis, Houston, Tex., assignors to Nordel Corporation, Houston, Tex., a corporation of Delaware Application April 23, 1942, Serial No. 440,264

5 Claims. (Cl. 175—182)

This invention relates to a novel and improved coupling circuit for coupling independent electric circuits and more particularly to a coupling circuit deriving energy from a circuit carrying either direct current or low frequency alternating current and producing a secondary direct current that is directly proportional to the amplitude of said first current.

An object is to provide a novel and improved coupling circuit of the above type in which no direct current path is established between the coupled circuits.

Another object of the invention is to provide a novel and improved circuit of the above type which is adapted for use with a circuit carrying direct current or carrying alternating current of such low frequency that ordinary transformer coupling is not feasible.

Other objects and advantages will be apparent as the nature of the invention is more fully disclosed.

The present coupling circuit has a wide application in the field of precision electrical measurements. A particular embodiment as applied to a geophysical prospecting system is set forth herein for purposes of illustration only.

Although the novel features which are believed to be characteristic of this invention are pointed out more particularly in the claims appended hereto, the invention itself may be better understood by referring to the following description, taken in connection with the accompanying drawings in which a specific embodiment thereof has been set forth for the purposes of illustration.

In the drawing:

Fig. 1 is a schematic diagram illustrating one embodiment of the invention;

Fig. 2 is a schematic diagram illustrating another embodiment of the invention; and Fig. 3 is a schematic diagram illustrating the invention applied to an electrical geophysical prospecting system.

In accordance with the present invention the circuits to be coupled are associated with primary and secondary coils having a periodically varying mutual reactance. The primary coil is arranged to produce a flux proportional to the current flowing in the first circuit. The flux threading the secondary coil, however, is periodically varied by an independent means so as to produce an alternating voltage in the secondary circuit having a frequency corresponding to the frequency of flux variation and having an amplitude corresponding to the amplitude of the current in the first circuit. The alternating secondary voltage is rectified to produce a unidirectional current which is directly proportional to the current flowing in said first circuit.

In the embodiment shown in Fig. 1 a magnetic core 2 is provided with a primary coil 3 and a secondary coil 4 and with a segment 5 of magnetic material which is mounted for rotation on a shaft 6 driven by a motor 7. The segment 5 completes the magnetic circuit of the core 2 and forms therewith gaps 8 which are small with the segment 5 in the position shown but increase in size when the segment is rotated into a position at right angles to that shown, thereby periodically varying the reluctance of the magnetic circuit.

The primary coil 3 is shown as connected to a pair of input terminals 10 and 11. The secondary coil 4 is connected by lines 14 and 15 to an impedance network 16 and thence by lines 21 and 22 to a rectifier 23. The D. C. output of the rectifier 23 is connected to a resistance 24 having adjustable taps 25 and 26. The impedance network 16 is so designed that the amplitude of the output current is substantially independent of variations in frequency, so that the direct current output of the rectifier 23 depends only on the value of the primary current. If the primary current is direct, the secondary current is dependent only on the magnitude of the primary current. If the primary current is alternating the secondary current is proportional to the amplitude of the primary current.

In the embodiment shown the network 16 comprises a resistance 17 and a condenser 18 connected in series between the lines 14 and 15. If the characteristics of the secondary 4 are such that the current increases with frequency, i. e., with increase in speed of rotation of the segment 5 which correspondingly increases the voltage induced in the secondary 4, the effect is counteracted by the shunt condenser 18 which has a lower impedance at higher frequencies and thus by-passes a greater portion of the total current. The values of the resistance 17 and the condenser 18 may be so chosen with respect to the characteristics of the secondary 4 that the output supplied to the lines 21, 22 is independent of frequency. For other types of transformers having different characteristics, the nature of the filter network may be varied to obtain the desired output characteristics.

The rectifier 23 is shown as a full wave rectifier comprising a pair of oxide rectifiers 19 connected across a resistor 20. The output resistor 24 is connected between the mid-point of the resistor 20 and the common lead 21 to the two rectifiers. It is to be understood, however, that other conventional rectifiers may be used.

Sliding taps or contacts 25 and 26, which are arranged to tap off any desired fraction of the total potential drop across the resistance 24, are connected to output terminals 27 and 28.

In the operation of this system, either a direct current or an alternating current of low frequency passing through the primary coil 3 produces a flux in the magnetic circuit of the core 2 and the segment 5. The value of the flux threading the secondary coil 4 varies periodically at a frequency double the frequency of rotation of the segment 5. An alternating current of a controlled frequency is thus produced in the secondary coil 4 having an amplitude proportional to the current flowing in the primary 3 and having a frequency which is determined by the speed of rotation of the segment 5. This alternating current is then passed through the impedance network 16, is rectified in the rectifier 23 and is passed as direct current through the resistance 24 to produce therein a potential drop which is directly proportional to the current flowing in the primary coil 3.

Fig. 2 shows another arrangement for obtaining a varying flux in the secondary coil which may be substituted for the magnetic core 2 of Fig. 1. In this figure the input terminals 10 and 11 are connected by lines 70 and 71 and brushes 72 and 73 to slip rings 74 and 75 respectively. These slip rings 74 and 75 are connected to a rotating coil 3' forming the primary of a transformer 77. The secondary 4' of the transformer 77 is connected to lines 14 and 15 which are connected to the filter 16 and rectifier 23 as in Fig. 1.

In this embodiment the primary current is passed through the coil 3', which is rotated by any suitable means and at a predetermined speed. The flux produced by the coil 3' may be constant or substantially constant in the case of direct current and in the case of low frequency alternating current will be reversed at a corresponding rate. This, however, is low as compared with the speed of rotation of the coil 3'. The flux threading the coil 4' will accordingly have an average value which is determined by the value of the current flowing in the coil 3', but will be reversed at a frequency corresponding to the speed of rotation of the coil 3'. In this way an alternating current is produced in the coil 4' having a value dependent upon the value of the primary current and having a frequency which may be varied and controlled as desired.

The application of the above described coupling circuit to a system of geophysical exploration of the general type disclosed in the copending application of Knute Evjen, Ser. 310,109 (now Patent 2,294,395), is shown in Fig. 3. In this figure the coupling circuit of Fig. 1 or Fig. 2 is indicated by the rectangle A. Referring to Fig. 3, a source 35 of direct current is connected by lines 36 and 37 to a reversing switch 39 having reversing contacts 40 and 41. An ammeter 42 is shown as connected in series with the lead 37. The reversing contact 40 of the switch 39 is connected by a lead 43 to a ground electrode 44. The reversing contact 41 is connected by a lead 45 to the input terminal 10 of the coupling circuit A. The input terminal 11 is connected by a lead 46 to a second ground electrode 47.

The output terminals 27 and 28 of the coupling circuit A are connected by lines 50 and 51 to a reversing switch 52 having reversing contacts 53 and 54. A direct current galvanometer 55 is shown as connected in series with the lead 50. The reversing contact 53 of the switch 52 is connected by a line 56 to an earth potential pick-up electrode 57. The other reversing contact 54 is connected by a line 58 to the adjustable contact 59 of a potentiometer 60 across which a battery 61 is connected. The midpoint of the battery 61 is connected by a lead 62 to a second earth potential pick-up electrode 63.

The reversing switches 31 and 52 may be of any suitable type, for example, of the type shown in the copending application of Haakon M. Evjen, Ser. 432,176 (now Patent 2,314,874), and are operated in synchronism.

In the operation of this system a current is passed through the earth between the electrodes 44 and 47 having a definite value and frequency, the value being dependent upon the source 35 and the frequency being dependent upon the frequency of operation of the reversing switch 31. The potential pick-up electrodes 57 and 63 are located at spaced points adjacent the earth's surface within the field of influence of the earth current produced by the earth current flowing between the current electrodes 44 and 47. This current is reversed at a frequency corresponding to that of the primary current. This alternating induced earth potential is picked up by the potential electrodes 57 and 63 and is rectified by the reversing switch 52, which operates in synchronism with the first reversing switch 31, to produce a direct current through the leads 50 and 51 and the galvanometer 55.

A direct measuring potential, derived from the potentiometer 24, is applied to oppose the potential derived from the pick-up electrodes 57 and 63. The value of this measuring potential may be varied by adjusting the contacts 25 and 26 until the measuring potential exactly balances the picked-up potential as indicated by a null balance on the galvanometer 55. It is to be noted that this measuring potential is directly proportional to the current which is flowing in the earth current circuit, but that the potential circuit is not connected to the earth current circuit by a resistance connection which would form a direct current path. In this system there are no brushes or relay contacts in the secondary circuit which might introduce variations in resistance. In the embodiment of Fig. 2 the brushes 72 and 73 in the primary circuit do not affect the accuracy of the measurements inasmuch as the current flowing in the primary coil 3' constitutes the current flowing in the earth circuit at any given instant or a predetermined portion thereof.

In making this measurement the effect of any residual earth current which would tend to produce a constant direct potential across the electrodes 57 and 63 is eliminated by suitable adjustment of the potentiometer 60. This adjustment may be made, for example, while no current is flowing through the earth circuit, so that the only effect on the galvanometer 55 represents the effect of the residual earth current. It may also be made during operation of the system inasmuch as the residual earth current, which is a unidirectional current, is reversed by the reversing switch 52 to produce an alternating current at the galvanometer 55, causing fluctuation of the galvanometer. The adjustment of the contact 59 may accordingly be made to eliminate these fluctuations of the galvanometer. Any drift in the natural earth potential will be immediately perceived and can be compensated for by readjustment of the potentiometer.

The setting of the potentiometer 24 measures the effective impedance of the earth to an electric current of the frequency at which the measurement is being taken. The measurement is repeated at different low frequencies and in different parts of the area under investigation. The various readings thus obtained may be interpreted to give an indication of the characteristics of the area under investigation as set forth in the Evjen application above mentioned.

It is to be noted that the primary winding 3 of the coupling circuit A is connected on the alternating current side of the switch 31. This causes periodic reversal of the flux and prevents any permanent magnetizing effect from being built up in the core.

It is to be noted that the above described coupling circuit may be used to couple a secondary direct current circuit to a primary circuit carrying direct current or a low frequency alternating current and may be used for various measuring devices where a direct measuring potential having the characteristics above mentioned is required.

Although specific embodiments of the invention have been shown for purpose of illustration, it is to be understood that the invention is not to be restricted thereto, but that various changes and modifications may be made therein as will be readily apparent to a person skilled in the art. The invention is only to be limited in accordance with the scope of the following claims.

What is claimed is:

1. A coupling circuit for coupling a primary circuit carrying direct current or low frequency alternating current to a D. C. secondary circuit for supplying to said secondary circuit a voltage drop proportional to the primary current for making precision measurements, said coupling circuit comprising a transformer having a magnetic circuit and primary and secondary windings coupled thereby, means connecting said primary winding to be energized from said primary circuit to produce a flux in said magnetic circuit proportional to said energization, means associated with said magnetic circuit to vary the reluctance thereof for effecting corresponding changes in flux, control means actuating said last means cyclically at a controlled frequency so as to produce an alternating current in the secondary winding having a frequency determined by the frequency of variation of said flux and an amplitude varying as a function of the amplitude of the primary current and of the rate of variation of said flux, and a transmission channel connecting said secondary to supply a voltage drop to said secondary circuit, said channel including a filter network having frequency transmission characteristics to compensate for changes in current intensity in said secondary winding due to variations in speed of operation of said control means, so that the voltage drop supplied by said channel to said secondary circuit is unaffected by changes in speed of operation of said control means and is a function only of the current flowing in the primary circuit.

2. A coupling circuit for coupling a primary circuit carrying direct current or low frequency alternating current to a D. C. secondary circuit for supplying to said secondary circuit a voltage drop proportional to the primary current for making precision measurements, said coupling circuit comprising a transformer having a magnetic circuit including a variable air gap and primary and secondary windings coupled thereby, means connecting said primary winding to be energized from said primary circuit to produce a flux in said magnetic circuit proportional to said energization, means to vary said air gap for effecting corresponding changes in flux, control means actuating said last means cyclically at a controlled frequency so as to produce an alternating current in the secondary winding having a frequency determined by the frequency of variation of said flux and an amplitude varying as a function of the amplitude of the primary current and of the rate of variation of said flux, and a transmission channel connecting said secondary to supply a voltage drop to said secondary circuit, said channel including a filter network having frequency transmission characteristics to compensate for changes in current intensity in said secondary winding due to variations in speed of operation of said control means, so that the voltage drop supplied by said channel to said secondary circuit is unaffected by changes in speed of operation of said control means and is a function only of the current flowing in the primary circuit.

3. A coupling circuit for coupling a primary circuit carrying direct current or low frequency alternating current to a D. C. secondary circuit for supplying to said secondary circuit a voltage drop proportional to the primary current for making precision measurements, said coupling circuit comprising a transformer having a magnetic circuit including a rotatable segment forming a variable air gap and primary and secondary windings coupled thereby, means connecting said primary winding to be energized from said primary circuit to produce a flux in said magnetic circuit proportional to said energization, control means rotating said segment at a controlled frequency so as to produce an alternating current in the secondary winding having a frequency determined by the frequency of rotation of said segment and an amplitude varying as a function of the amplitude of the primary current and of the rate of variation of said flux, and a transmission channel connecting said secondary to supply a voltage drop to said secondary circuit, said channel including a filter network having frequency transmission characteristics to compensate for changes in current intensity in said secondary winding due to variations in speed of operation of said control means, so that the voltage drop supplied by said channel to said secondary circuit is unaffected by changes in speed of operation of said control means and is a function only of the current flowing in the primary circuit.

4. A coupling circuit for coupling a primary circuit carrying direct current or low frequency alternating current to a D. C. secondary circuit for supplying to said secondary circuit a voltage drop proportional to the primary current for making precision measurements, said coupling circuit comprising a transformer having a magnetic circuit and primary and secondary windings coupled thereby, means connecting said primary winding to be energized from said primary circuit to produce a flux in said magnetic circuit proportional to said energization, means associated with said magnetic circuit to vary the reluctance thereof for effecting corresponding changes in flux, control means actuating said last means cyclically at a controlled frequency so as to produce an alternating current in the secondary winding having a frequency determined by the frequency of variation of said flux and an amplitude varying as a function of the amplitude of the primary current and of the rate of variation of said flux, and a transmission channel connecting said secondary to supply a voltage drop to said secondary circuit, said channel including a filter network having frequency transmission characteristics to compensate for changes in current intensity in said secondary winding due to variations in speed of operation of said control means, so that the current passed by said filter network is unaffected by changes in speed of operation of said control means and is a function only of the current flowing in the primary circuit, a rectifier connected to rectify the current passed by said network, a load resistance connected to pass the D. C. output of said rectifier, and connections connecting said load resistance to supply a voltage drop to said secondary circuit.

5. In a geophysical prospecting system having an earth circuit carrying direct current or low frequency alternating current and a potential pick-up circuit influenced thereby, a coupling circuit for coupling said first circuits for supplying to said potential circuit a potential drop proportional to the current flowing in said earth current circuit for making precision measurements, said coupling circuit comprising a transformer having a magnetic circuit including a variable air gap and primary and secondary windings coupled thereby, means connecting said primary winding to be energized from said earth current to produce a flux in said magnetic circuit proportional to said energization, means associated with said magnetic circuit to vary the air gap for effecting corresponding changes in flux, control means actuating said last means cyclically at a controlled frequency so as to produce an alternating current in the secondary winding having a frequency determined by the frequency of variation of said flux and an amplitude varying as a function of the amplitude of the primary current and of the rate of variation of said flux, and a transmission channel connecting said secondary to supply a voltage drop to said potential pick-up circuit, said channel including a filter network having frequency transmission characteristics to compensate for changes in current intensity in said secondary windings due to variations in speed of operation of said control means, so that the voltage drop supplied by said channel to said potential circuit is unaffected by changes in speed of operation of said control means and is a function only of the current flowing in the earth current circuit.

HAAKON M. EVJEN.
WILLIAM BRADLEY LEWIS.